United States Patent
Ma et al.

(10) Patent No.: US 7,899,068 B1
(45) Date of Patent: Mar. 1, 2011

(54) COORDINATED QUEUING BETWEEN UPSTREAM AND DOWNSTREAM QUEUES IN A NETWORK DEVICE

(75) Inventors: Qingming Ma, Santa Clara, CA (US); Jiaxiang Su, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 417 days.

(21) Appl. No.: 11/869,327

(22) Filed: Oct. 9, 2007

(51) Int. Cl.
*H04L 12/28* (2006.01)

(52) U.S. Cl. ............... 370/412; 370/392; 370/395.5; 370/395.4; 370/474; 370/235

(58) Field of Classification Search ............... 370/235, 370/392, 395.4, 412, 468, 474; 710/39
See application file for complete search history.

(56) References Cited

U.S. PATENT DOCUMENTS

| | | | |
|---|---|---|---|
| 2003/0123392 A1* | 7/2003 | Ruutu et al. | 370/235 |
| 2004/0001491 A1* | 1/2004 | Ruutu et al. | 370/395.4 |
| 2006/0140191 A1* | 6/2006 | Naik | 370/395.4 |
| 2008/0117913 A1* | 5/2008 | Tatar et al. | 370/392 |
| 2008/0119713 A1* | 5/2008 | Le Nezet et al. | 600/407 |
| 2008/0159145 A1* | 7/2008 | Muthukrishnan et al. | 370/235 |
| 2009/0207859 A1* | 8/2009 | Beshai et al. | 370/474 |

FOREIGN PATENT DOCUMENTS

EP    0 973 290 A2 *  6/1999

* cited by examiner

*Primary Examiner* — Dang T Ton
*Assistant Examiner* — Mohamed Kamara
(74) *Attorney, Agent, or Firm* — Harrity & Harrity, LLP

(57) ABSTRACT

A system determines a scheduling value based on a current length of a downstream queue in a network device. The system sends the scheduling value from the downstream queue to an upstream queue and schedules dequeuing of one or more data units, destined for the downstream queue, from the upstream queue based on the scheduling value.

6 Claims, 14 Drawing Sheets

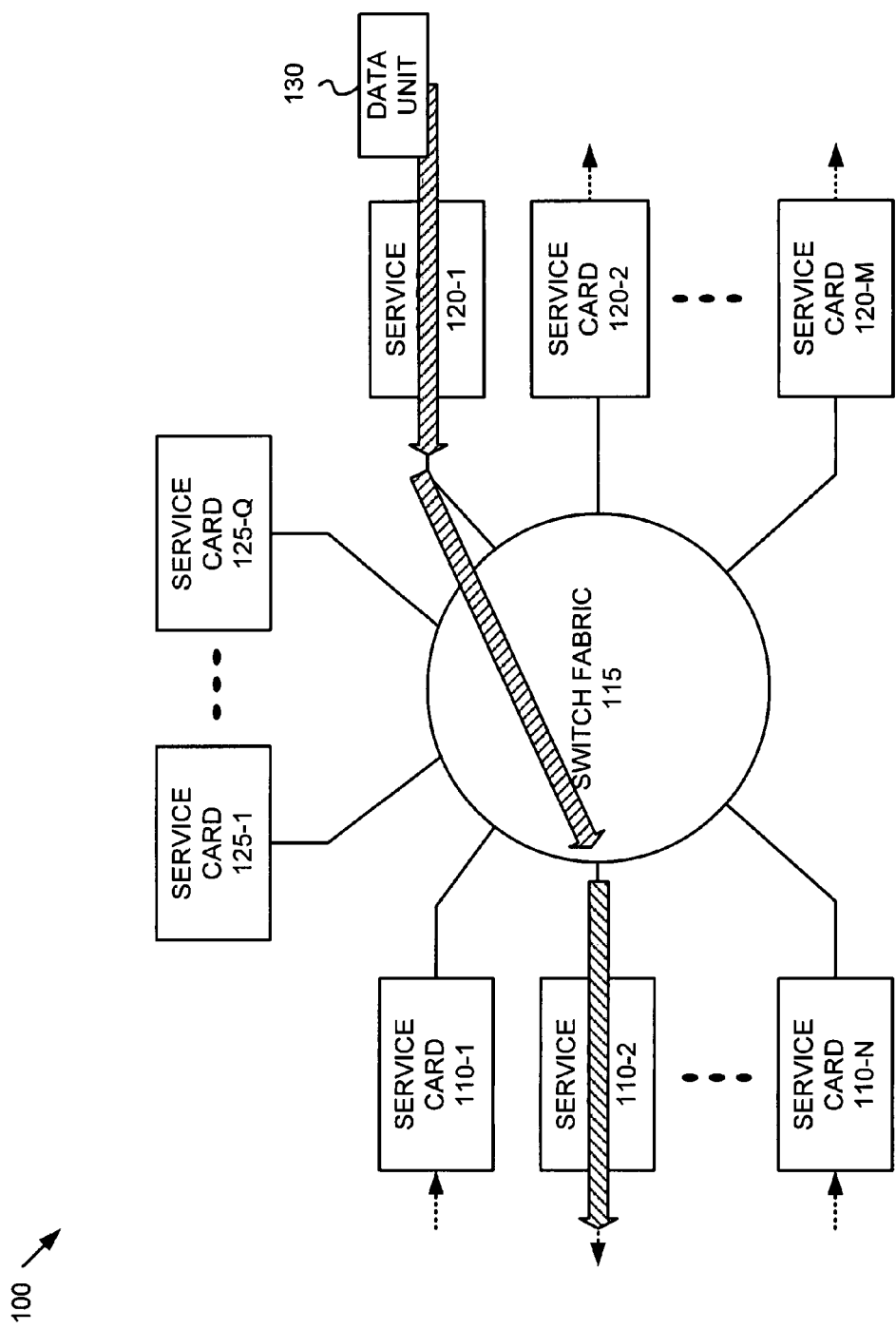

ual patent tends us

COORDINATED QUEUING BETWEEN UPSTREAM AND DOWNSTREAM QUEUES IN A NETWORK DEVICE

BACKGROUND

In network devices, including, for example, routers, switches or integrated security service gateway systems, packets travel through multiple service cards (e.g., security service cards or input/output (I/O) line cards) while being processed. Ingress I/O cards of the multiple service cards are the first service cards in the network device and egress I/O cards of the multiple service cards are the last service cards in the network device. Hierarchical class-based queuing may be implemented in the individual service cards to enforce quality of service constraints on packet traffic handled by the service cards. Weight-based packet schedulers are commonly used in scheduling packet queuing/dequeuing in such service cards.

Weight-based packet schedulers schedule packets for each of the queues based on a configured weight regardless of traffic conditions in downstream service cards. Some typical weight-based scheduling algorithms may not work well under a number of conditions, including when the size of a packet changes in different service cards because of compression/decompression or encryption/decryption or when the time needed to process packets of a traffic class is different in different service cards. As a result, queues at downstream service cards that employ existing weight-based scheduling algorithms may be handling too many packets, while the upstream service card continues to schedule and process packets that will be sent to these downstream queues. However, at the same time, other queues in a downstream service card may be empty while the upstream service card does not process, or slowly processes, packets destined for these other queues.

SUMMARY

In accordance with one implementation, a method may include determining a scheduling value based on a current length of a downstream queue in a network device; sending the scheduling value from the downstream queue to an upstream queue; and scheduling dequeuing of one or more data units, destined for the downstream queue, from the upstream queue based on the scheduling value.

In another implementation, a network device may include a first ingress card configured to receive a first data unit from a network and including a first upstream queue that queues the received first data unit. The network device further may include a switch fabric coupled to the ingress card and to a first egress card and configured to transfer data units from the ingress card to the first egress card. The first egress card may further include a first downstream queue for buffering the first data unit prior to forwarding the first data unit towards a destination via the network and be configured to: determine a first scheduling value as a function of a priority and current length of the first downstream queue, and send the first scheduling value to the first ingress card. The first ingress card may be further configured to schedule dequeuing of the first data unit from the first upstream queue based on the first scheduling value.

In still another implementation, a method may include receiving, at an upstream queue, a message from a downstream queue that includes a scheduling parameter whose value is related to a current length of the downstream queue; determining a weight based on the scheduling parameter; and scheduling dequeuing of a data unit, destined for the downstream queue, from the upstream queue based on the determined weight.

In yet another implementation, a network device may include an upstream queue in a processing path of the network device configured to queue data units received from a network and a downstream queue in the processing path configured to queue the data units prior to forwarding the data units to a network destination. The network device may further include a unit associated with the downstream queue and configured to send a scheduling parameter whose value is related to a current length of, and a priority associated with, the downstream queue to a scheduling unit associated with the upstream queue. The scheduling unit may be configured to determine a weight based on the scheduling parameter; and schedule dequeuing of a data unit, destined for the downstream queue, from the upstream queue based on the determined weight.

In a further implementation, a system may include an upstream queue located at an upstream point along a processing path in a network device and a downstream queue located at a downstream point along the processing path in the network device. The system may further include means for determining a queue state value based on a priority associated with, and a current length of, the downstream queue; means for sending the queue state value from the downstream queue to the upstream queue; and means for scheduling dequeuing of one or more data units, destined for the downstream queue, from the upstream queue based on the queue state value.

BRIEF DESCRIPTION OF THE DRAWINGS

The accompanying drawings, which are incorporated in and constitute a part of this specification, illustrate one or more embodiments described herein and, together with the description, explain the invention. In the drawings.

FIGS. 1B, 1C, 1D and 1E are diagrams of exemplary paths data units may take when traversing the exemplary network device of FIG. 1A;

DETAILED DESCRIPTION

Figure 1A:
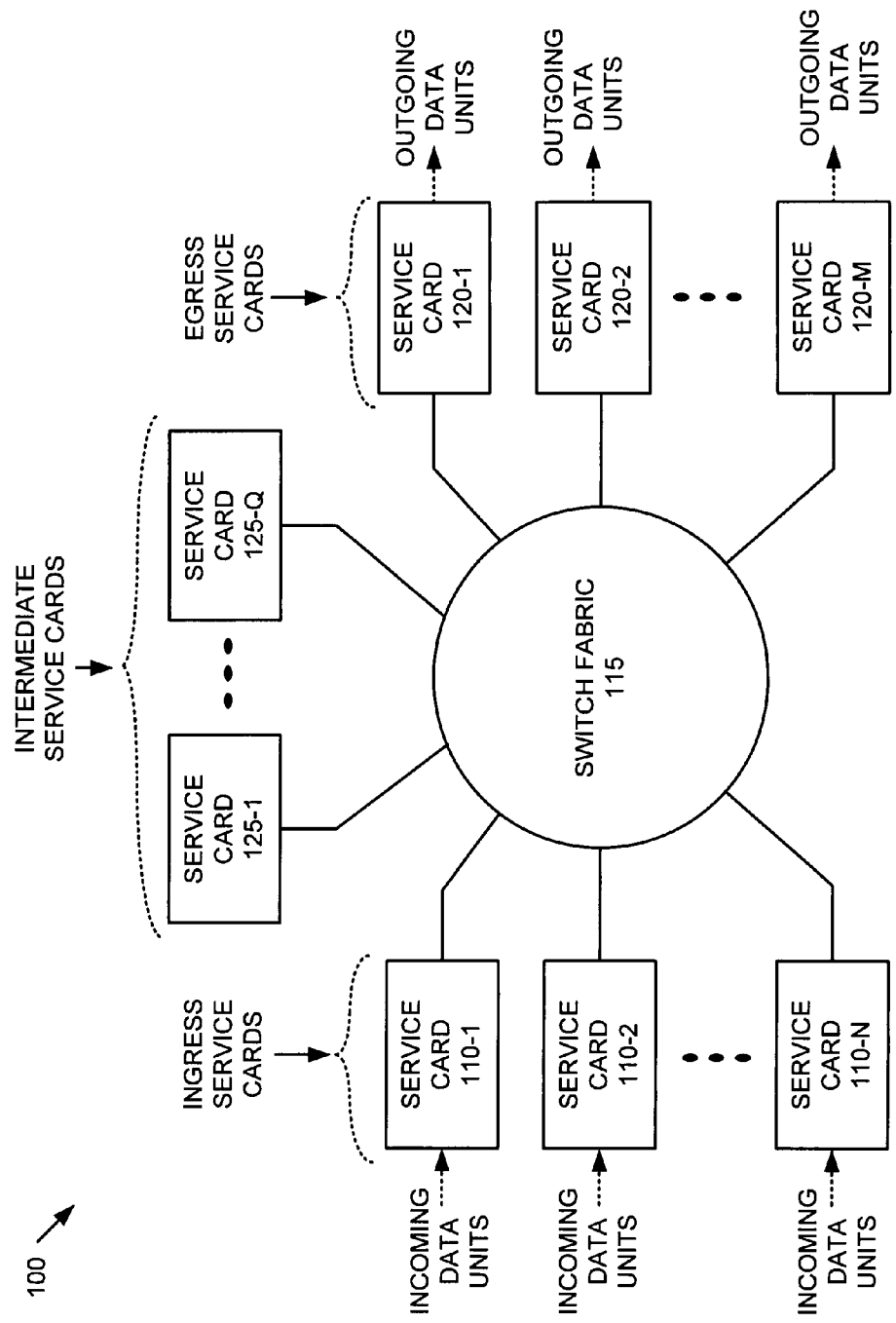
FIG. 1A is a diagram of a network device according to an exemplary implementation.

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments implement mechanisms that coordinate the queueing of data units between downstream and upstream service cards in a network device. Exemplary embodiments described herein use a queue state value, determined at a downstream queue associated with a downstream service card, for scheduling the dequeueing of data units destined for that downstream queue at an upstream queue associated with an upstream service card. The queue state value may, in one exemplary implementation, be determined as a function of a current length of the downstream queue. The queue state value may also be determined as a function of a priority of the downstream queue. Upon receipt of the queue state value for a downstream queue, a scheduler at an upstream service card may determine a weight based on the queue state value, and schedule the dequeueing of data units destined for the downstream queue based on the determined weight. A scheduling weight associated with a downstream queue may, thus, be adjusted dynamically based on new queue state values periodically determined for the downstream queue. Scheduling the dequeueing of data units, at upstream service cards, that are destined for a downstream queue based on the dynamic weight may prevent data unit congestion from occurring at the downstream queue.

Exemplary Network Device

FIG. 1 illustrates a network device 100 according to an exemplary implementation. Network device 100 may include a router, a switch, a gateway, or any type of network device that routes or switches data units towards one or more network destinations. Network device 100 may receive one or more data units from one or more incoming physical links, process the data units to determine destination information, and transmit the data units on one or more outgoing links in accordance with the destination information. The data units may include packets, cells, or datagrams; fragments of packets, cells, or datagrams; or other types of data. The one or more incoming physical links and the one or more outgoing links may connect to a network (not shown).

Network device 100 may include one or more ingress service cards 110-1 through 110-N (collectively referred to herein as "service cards 110"), a switch fabric 115, one or more egress service cards 120-1 through 120-M (collectively referred to herein as "egress cards 120"), and one or more intermediate service cards 125-1 through 125-Q (collectively referred to herein as "service cards 125"). Ingress service cards 110 may receive data units from the network (not shown) via one or more physical links and may forward the received data units through switch fabric 115 to respective egress service cards 120. Intermediate service cards 125 may include special purpose cards that perform various specialized functions. For example, service cards 125 may include a firewall service card, an intrusion detection service card, an encryption/decryption service card, or other types of special purpose cards. Switch fabric 115 may include one or more switching planes to facilitate communication between ingress service cards 110, intermediate service cards 125 and egress service cards 120. In one exemplary implementation, each of the switching planes may include a three-stage switch of crossbar elements. Other types of switching planes may, however, be used in switch fabric 115. Egress service cards 120 may receive data units from switch fabric 115 and may forward the data units towards destinations in the network (e.g., a next hop destination) via one or more outgoing physical links.

Network device 100 may include additional components that are not shown in FIG. 1. For example, network device 100 may include a routing engine that performs high level management functions for network device 100. For example, the routing engine may communicate with other nodes, networks and/or systems connected to network device 100 to exchange information regarding network topology. The routing engine may create routing tables based on the network topology information and forward the routing tables to ingress service cards 110, egress service cards 120 or intermediate service cards 125. The routing engine may also perform other general control and monitoring functions for network device 100.

The service cards in FIG. 1A have been arbitrarily designated as "ingress service cards" or "egress service cards" for purposes of illustration. Each one of service cards 110-1 through 110-N or 120-1 through 120-M may act as an ingress and/or an egress card. Thus, each one of service cards 110-1 through 110-N or 120-1 through 120-M may receive data units from the external network, or forward data units received from switch fabric 115 towards destinations in the external network. FIGS. 1B, 1C, 1D and 1E illustrate examples of service cards 110 and 120 acting as both ingress and egress cards, and examples of paths through network device 100 that includes service cards 110, 120 and/or 125.

Figure 1B:
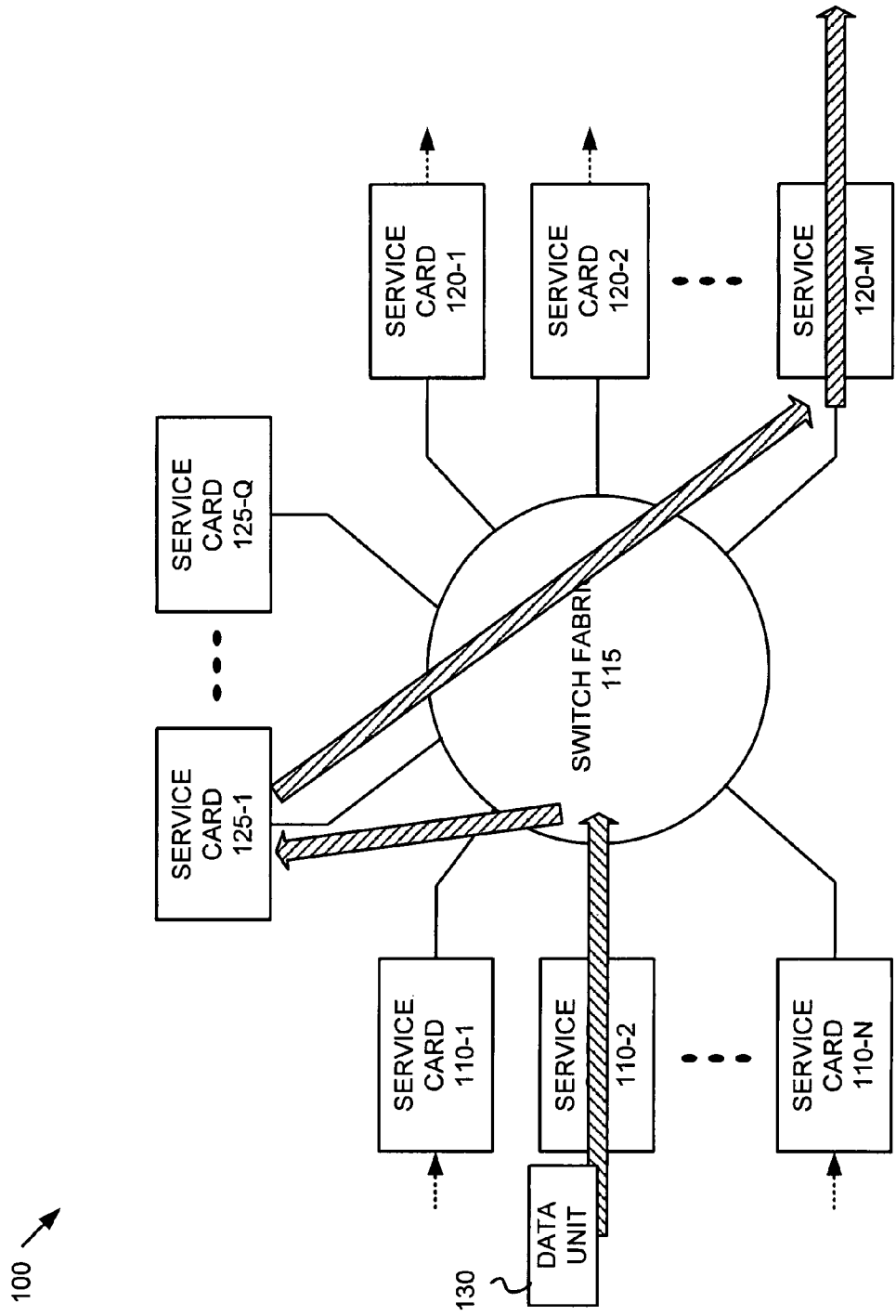

As shown in the example of FIG. 1B, a data unit 130 may be received at a service card 110-2, acting as an ingress service card, from the external network and data unit 130 may be forwarded to an intermediate service card 125-1 for special purpose processing via switch fabric 115. Intermediate service card 125-1 may then forward, via switch fabric 115, data unit 130 to a service card 120-M that is acting as an egress service card. Service card 120-M may forward data unit 130 towards its destination in the external network. In the example of FIG. 1B, service card 110-2 acts as an upstream card, service card 125-1 acts as both a downstream service card and an upstream service card, and service card 120-M acts as a downstream service card.

Figure 1C:
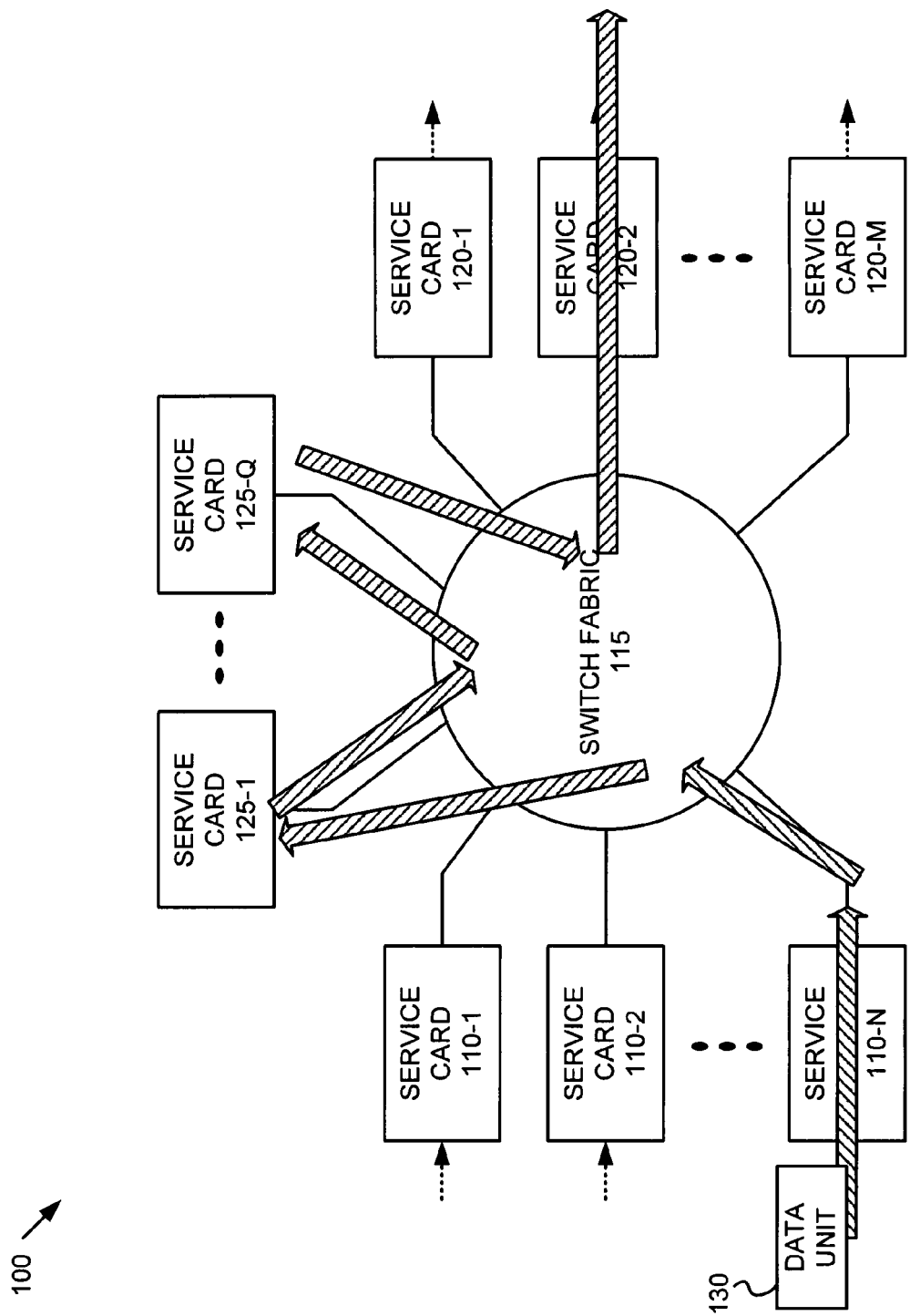

As further shown in the example of FIG. 1C, data unit 130 may be received at a service card 110-N, acting as an ingress service card, from the external network and data unit 130 may be forwarded to an intermediate service card 125-1 for special purpose processing via switch fabric 115. Service card 125-1 may then forward data unit 130 to another intermediate service card 125-Q, via switch fabric 115, for additional special purpose processing. Service card 125-Q may then forward data unit 130, via switch fabric 115, to service card 120-2 that is acting as an egress service card. Service card 120-2 may forward data unit 130 towards its destination in the external network. In the example of FIG. 1C, service card 110-N acts as an upstream service card, service cards 125-1 and 125-Q both act as upstream and downstream service cards, and service card 120-2 acts as a downstream service card.

Figure 1D:
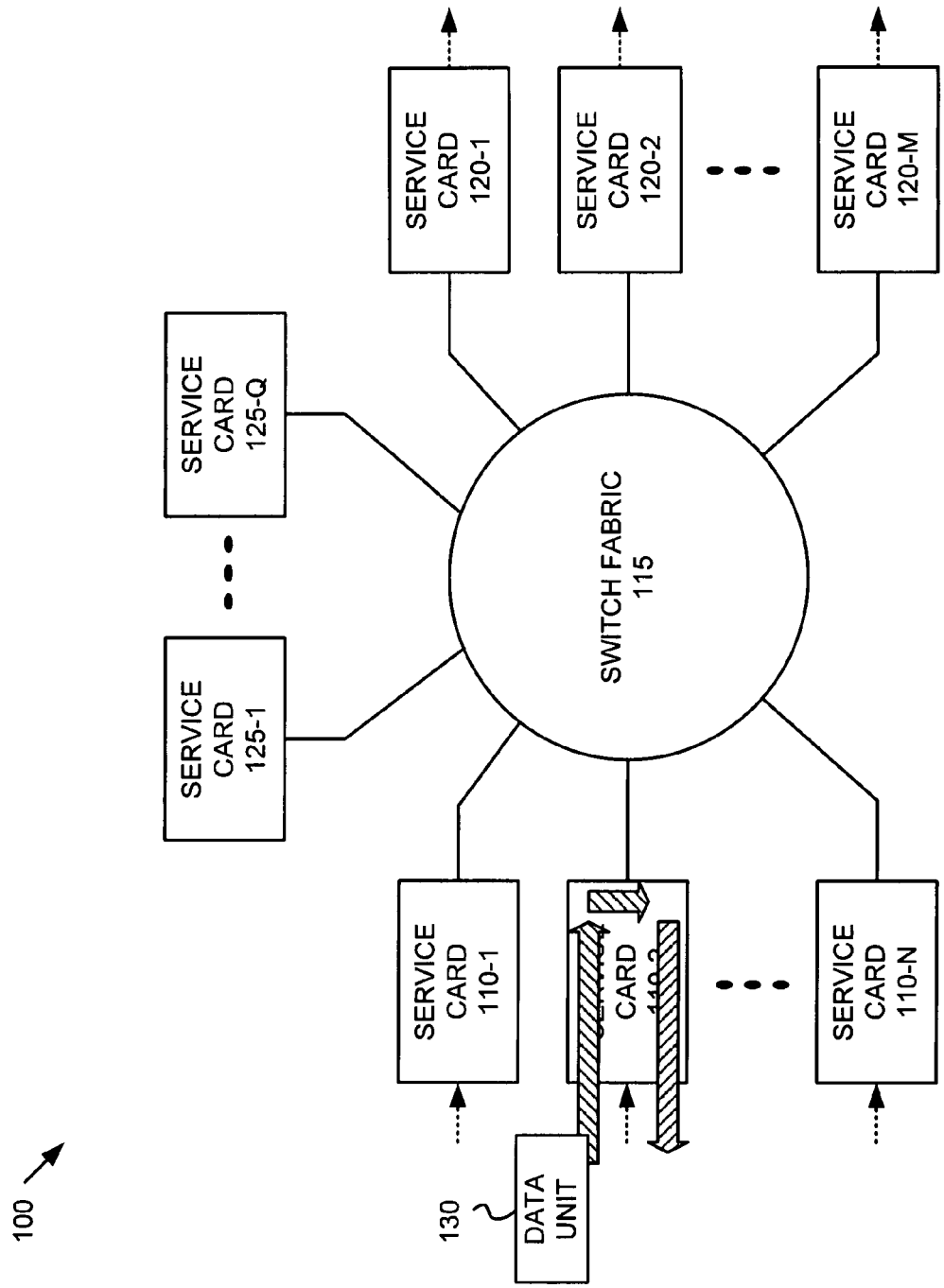

As also shown in the example of FIG. 1D, data unit 130 may be received at service card 110-2, acting as an ingress service card, from the external network. Service card 110-2 may then forward data unit 130 towards its destination in the external network via the same link from which the data unit was received. Service card 110-2, thus, in this example, acts as both an ingress service card and egress service card for the same data unit.

As additionally shown in the example of FIG. 1E, data unit 130 may be received at service card 120-1, acting as an ingress service card, from the external network. Service card 120-1 may then forward data unit 130 to service card 110-2 via switch fabric 115. Service card 110-2, acting as an egress service card, may then forward data unit 130 towards its destination in the external network. In the exemplar of FIG. 1E, service card 120-1 acts as an upstream service card and service card 110-2 acts as a downstream service card.

Exemplary Upstream Service Card

Figure 2:
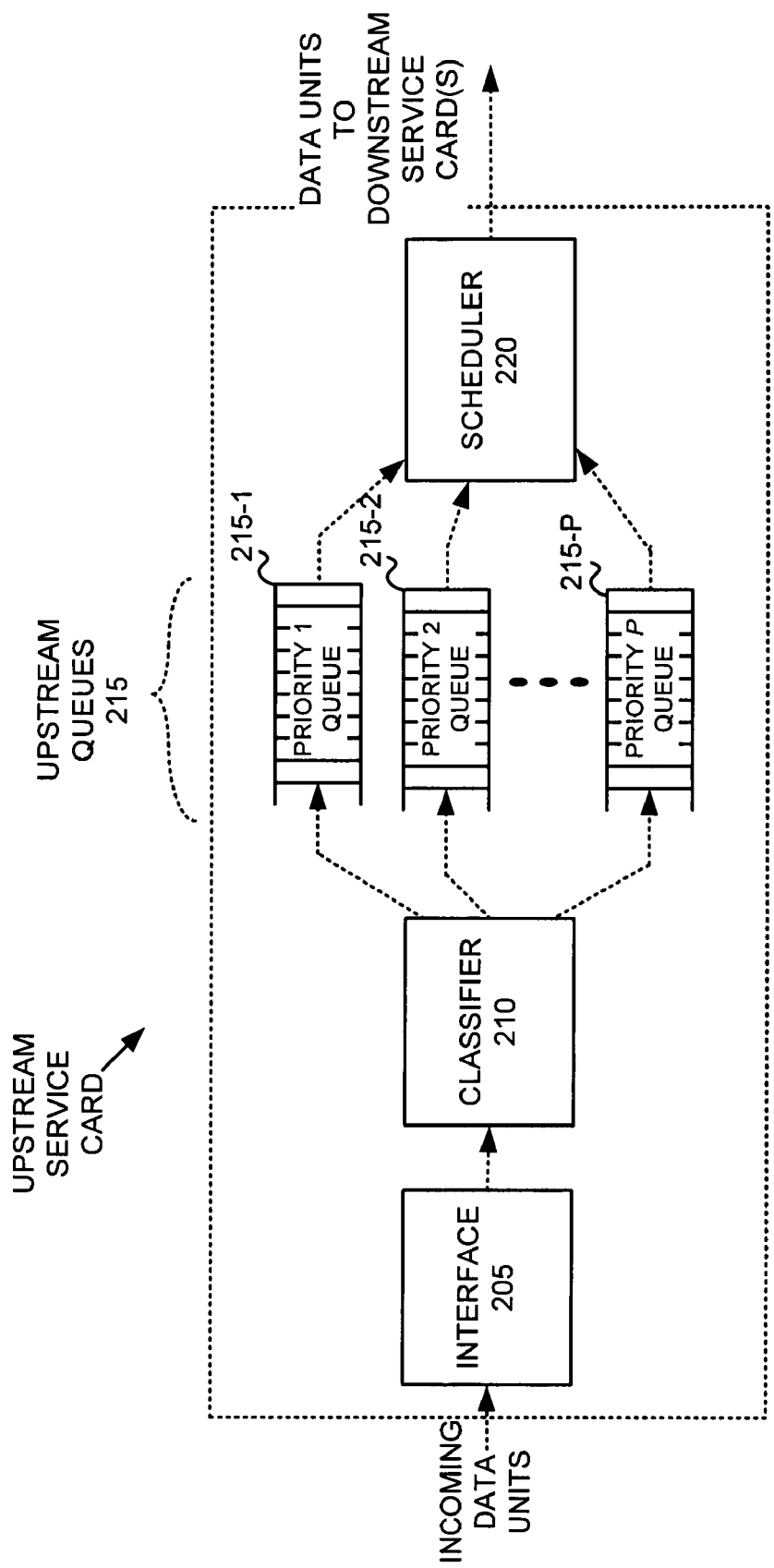
FIG. 2 is a diagram that illustrates exemplary components of an upstream service card of the network device of FIG. 1.

FIG. 2 illustrates exemplary components of an upstream service card. Service cards 110, 120 and/or 125 may each act as an upstream service card depending on the path a given data unit takes when traversing network device 100. As shown in FIG. 2, the upstream service card may include an interface 205, a classifier 210, one or more upstream queues 215 and a scheduler 220. Interface 205 may receive data units on a physical link connected to a network, such as a wide area network (WAN), the Internet, etc., or may receive data units from switch fabric 115. Each physical link could be one of many types of transport media, such as optical fiber or Ethernet cable. Classifier 210 may classify incoming data units as belonging to a particular priority or class. For example, a given incoming data unit may include data in its header that designates the data unit as a high service priority data unit. Classifier 210 may assign the incoming data unit to an appropriate one of upstream queues 215 based on the designated priority/class of the incoming data unit.

Upstream queues 215 may include multiple queues 220-1 through 220-P, each of which may be associated with a different service priority and/or class of data unit. For example, if there are four service priorities 1 through 4 associated with incoming data units, then upstream queues 215 may include priority queues 215-1 through 215-4. Each of queues 215-1 through 215-P may queue respective data units and may dequeue those data units based on scheduling commands received from scheduler 225. A single queue of queues 215-1 through 215-P may be generically referred to here as a "queue 220-x."

Scheduler 220 may use queue state values ($f_n$), received from downstream queues in egress cards 120, for scheduling the dequeueing of data units from upsteam queues 215 destined for those downstream queues. Scheduler 220 may determine a dynamic weight (dynamic_weight) that may be used for scheduling the dequeueing of one or more data units from a respective queue of upstream queues 215, where the dynamic weight is determined based on a queue state value ($f_n$) received from a corresponding downstream queue that is the destination of the one or more data units. In one exemplary implementation, the dynamic weight for a given queue may be a function of the queue state value ($f_n$) and a configured weight. The configured weight may include a pre-set value.

The upstream service card may include additional components not shown in FIG. 2. For example, the upstream service card may include one or more forwarding engines. The one or more forwarding engines may receive routing tables from a routing engine and use the routing tables to perform route lookup for incoming data units. The forwarding engine(s) may, therefore, determine a next hop destination for a given data unit, which in turn, determines which service card will act as the egress card for handling the outgoing data unit once it traverses switch fabric 115.

Exempary Downstream Service Card

Figure 3:
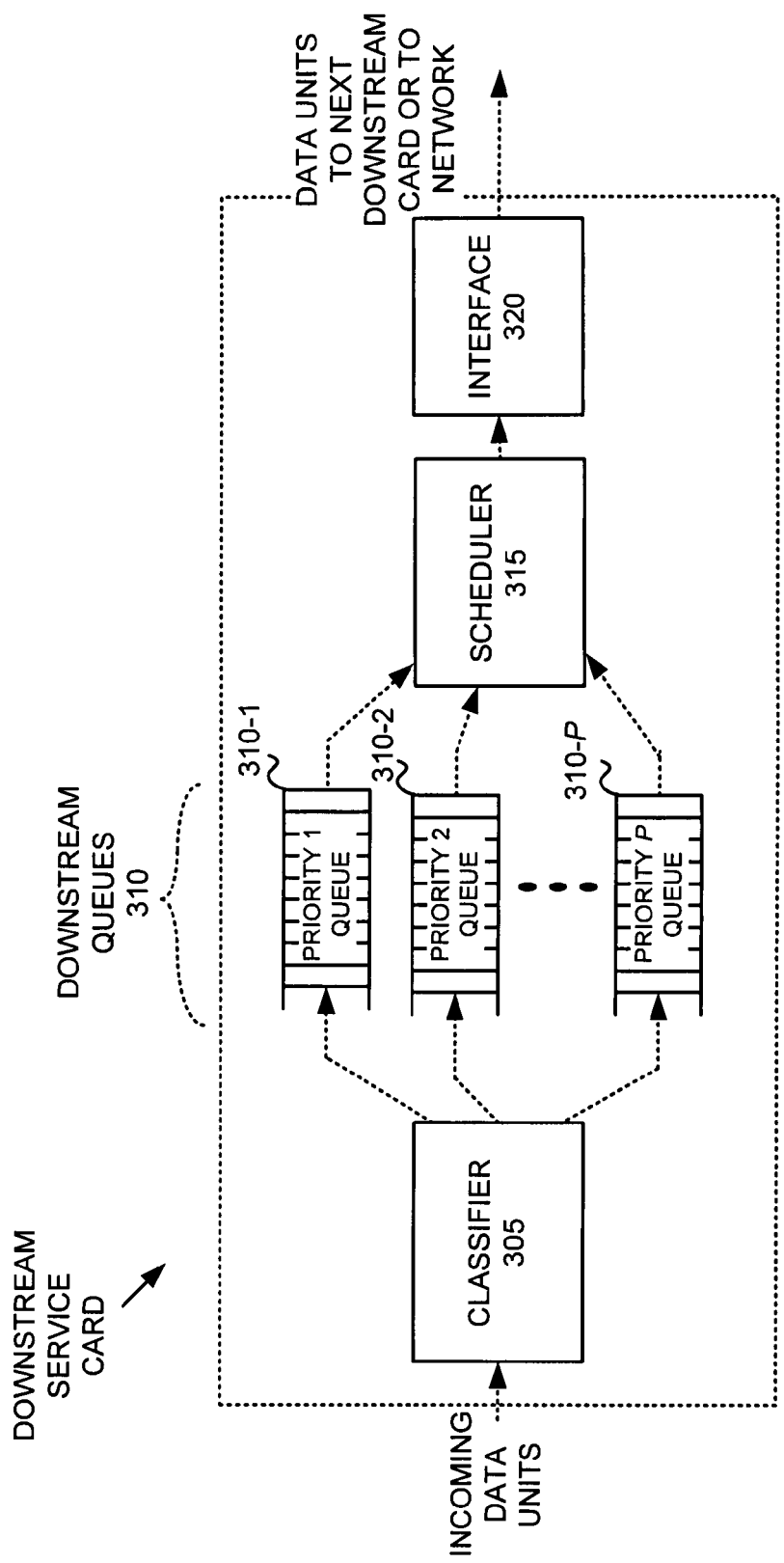
FIG. 3 is a diagram that illustrates exemplary components of a downstream service card of the network device of FIG. 1.

FIG. 3 illustrates exemplary components of a downstream service card. Service cards 110, 120 and/or 125 may each act as a downstream service card depending on the path a given data unit takes when traversing network device 100. As shown in FIG. 3, the downstream service card may include a classifier 305, downstream queues 310, a scheduler 315 and an interface 320. Classifier 305 may classify incoming data units as belonging to a particular traffic priority or class. For example, a given incoming data unit may include data in its header that designates the data unit as a high service priority data unit. Classifier 305 may assign the incoming data unit to an appropriate one of downstream queues 310 based on the designated priority/class of the incoming data unit.

Downstream queues 310 may include multiple queues 310-1 through 310-P, each of which may be associated with a different traffic service priority and/or class of data unit. For example, if there are four service priorities 1 through 4 associated with incoming data units, than downstream queues 310 may include priority queues 310-1 through 310-4. Each of queues 310-1 through 310-P may queue respective data units and may dequeue those data units based on scheduling commands received from scheduler 315. A single queue of queues 310-1 through 310-P may be generically referred to here as a "queue 310-x."

Scheduler 315 may a determine queue state value ($f_n$) for each one of downstream queues 310. The queue state value ($f_n$) may, in one implementation, be a functional value. The function used to determine the queue state value ($f_n$) may satisfy the following properties:

1) when the downstream queue is approaches a full state, the value of the function should approach zero quickly;

2) when the downstream queue approaches being empty, the value of the function should approach one and should change slowly;

3) for a same queue size, when the priority is higher, the value of $f_n$ should be smaller (e.g., high priority queues can be drained of data units more quickly than low priority queues, therefore, adjustment of the queue state value should be less aggressive for high priority queues). For a same queue size, when the priority is higher, the value of $f_n$ should be smaller and as the downstream queue approaches full, the value of $f_n$ should approach zero less quickly than a low priority queue. In one exemplary implementation, the queue state value ($f_n$) may be derived using the following function:

$$f_n(\text{priority, queue\_length}) = 1 - \left(\frac{\text{queue\_length}}{\text{full\_queue\_size}}\right)^{priority} \quad \text{Eqn. (1)}$$

where priority is the priority associated with the downstream queue,
queue_length is the current length of the downstream queue, and
full_queue_size is a maximum size of the downstream queue.

In other embodiments, other functions that may satisfy properties 1), 2) and 3) may be used and the queue state value ($f_n$) may vary between values other than zero and one.

Scheduler 315 may send a notification that may include a queue state value ($f_n$) for a downstream queue 310 along with an identifier for the downstream queue, to scheduler 220 of each upstream service card. Scheduler 315 may send a different notification, for each downstream queue, that includes a queue state value ($f_n$) and identifier for that downstream queue, or may send a single notification that includes multiple queue state values and multiple queue identifiers for multiple downstream queues 310.

Interface 320 may send outgoing data units to a next downstream card in network device 100 or on a physical link connected to a network, such as a wide area network (WAN), the Internet, etc. Each physical link could be one of many types of transport media, such as optical fiber or Ethernet cable.

Exemplary Upstream and Downstream Queueing/Dequeueing Coordination

Figure 4:
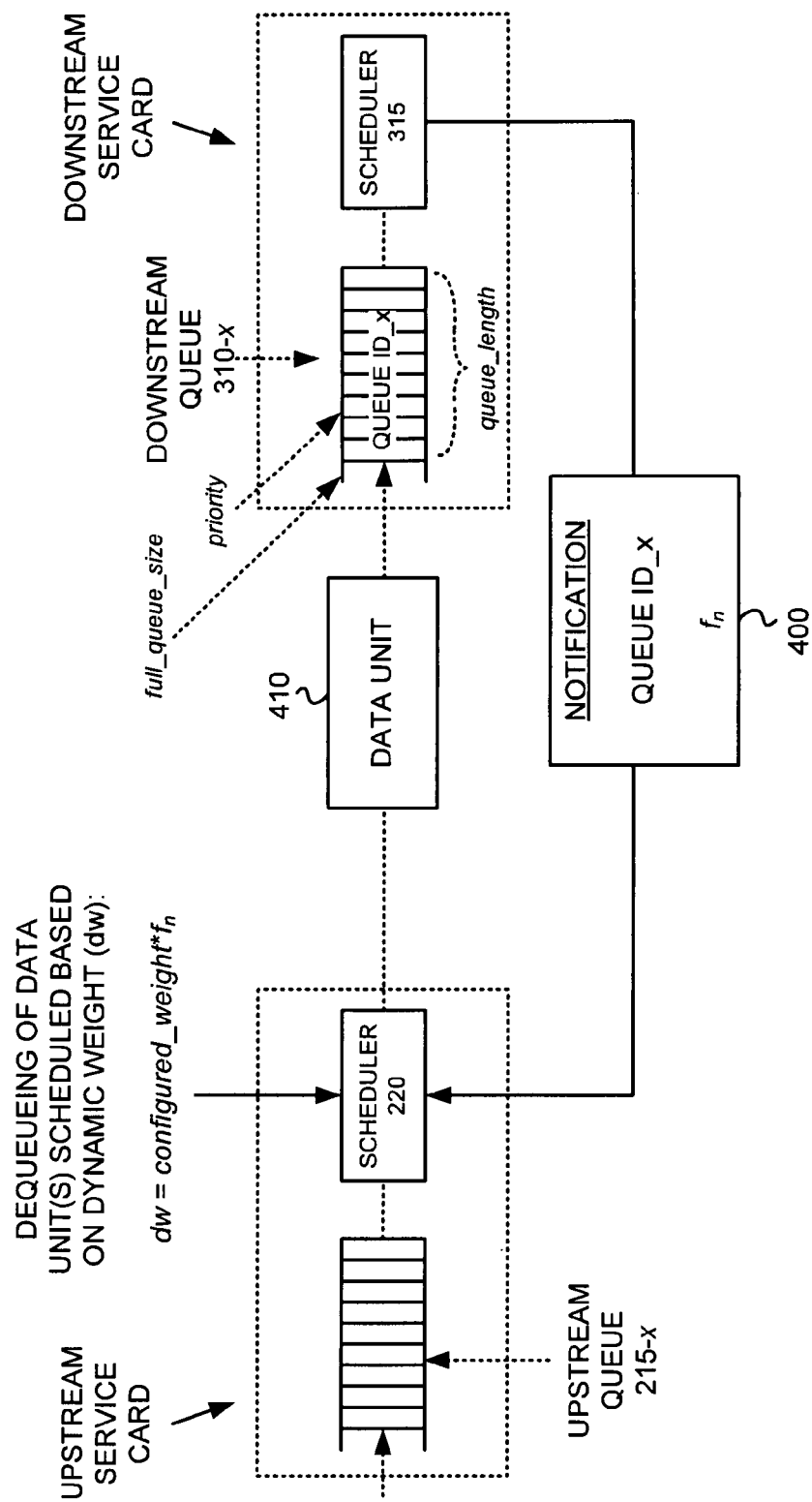
FIG. 4 is a diagram that depicts a downstream service card sending a notification to an upstream service card to coordinate the dequeueing of data units destined for a downstream queue of the downstream card according to an exemplary implementation.

FIG. 4 depicts a downstream service card sending a notification to an upstream service card to coordinate the dequeueing of data units destined for downstream queues 315 of the downstream service card according to an exemplary implementation. As shown in FIG. 4, scheduler 315 of the downstream service card may send a notification 400 message that includes a queue state value $f_n$ and a queue identifier (queue_ID_x) associated with a given downstream queue 310-$x$. The queue state value $f_n$ may be determined by scheduler 315 based on a function of a number of parameters. Those parameters may include, for example, a priority of the downstream queue 310-$x$, a current length of the downstream queue 310-$x$, and a size of the downstream queue 310-$x$ when completely full. In one exemplary implementation, scheduler 315 may determine the queue state value $f_n$ based on the function set forth in equation (1) above. Upon receiving notification 400, scheduler 220 at the upstream service card may extract the queue identifier (queue_ID_x) and queue state value $f_n$ from notification 400. Scheduler 220 may then determine a dynamic weight (dw) based on the queue state value $f_n$. In one exemplary implementation, scheduler 220 may multiply a configured weight by the queue state value $f_n$ to determine the dynamic weight as further described below. Scheduler 220 may then schedule dequeuing of data unit 410 from upstream queue 215-$x$ that is destined for downstream queue 310-$x$.

Exemplary Upstream Queue State Table

Figure 5:
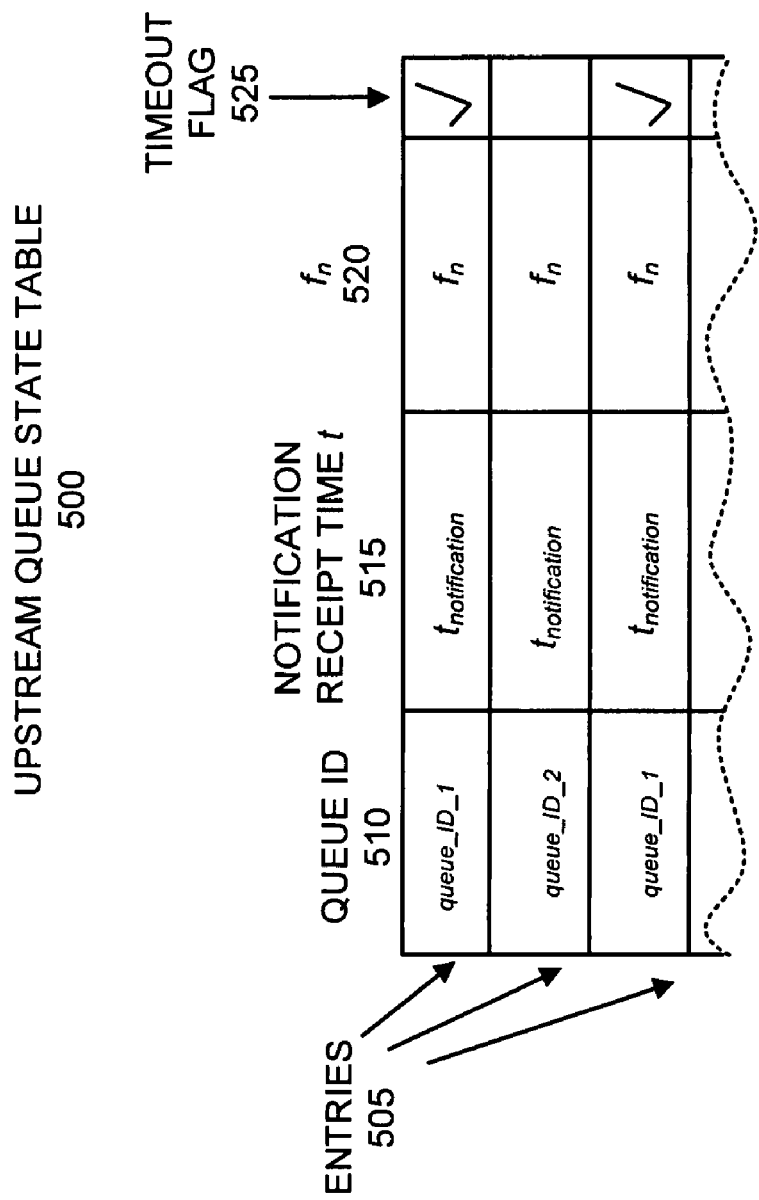
FIGS. 5 and 6 illustrate exemplary queue state tables that may be stored in association with each service card of the network device of FIG. 1.

FIG. 5 illustrates an exemplary queue state table 500 that may be stored in association with an upstream service card 110 of network device 100. Each service card 110, 120 and 125 of network device 100 may have a respective upstream queue state table 500 stored in association with it.

Queue state table 500 may include multiple entries 505, each of which may include a queue ID 510, a notification receipt time t 515, a current queue state value f 520 and a timeout flag 525. Queue ID 510 may uniquely identify a downstream queue 310-$x$ from all of the queues of service cards 110, 120 or 125. Notification receipt time t 515 may include a time at which a last notification message was received from a downstream service card associated with the downstream queue identified by queue ID 510. Queue state value $f_n$ 520 may include the most recent queue state value, for the downstream queue identified by queue ID 510, received from an associated downstream service card. Timeout flag 525 may include a flag that identifies if the downstream queue identified by queue ID 510 has been timed out.

Exemplary Downstream Queue State Table

Figure 6:
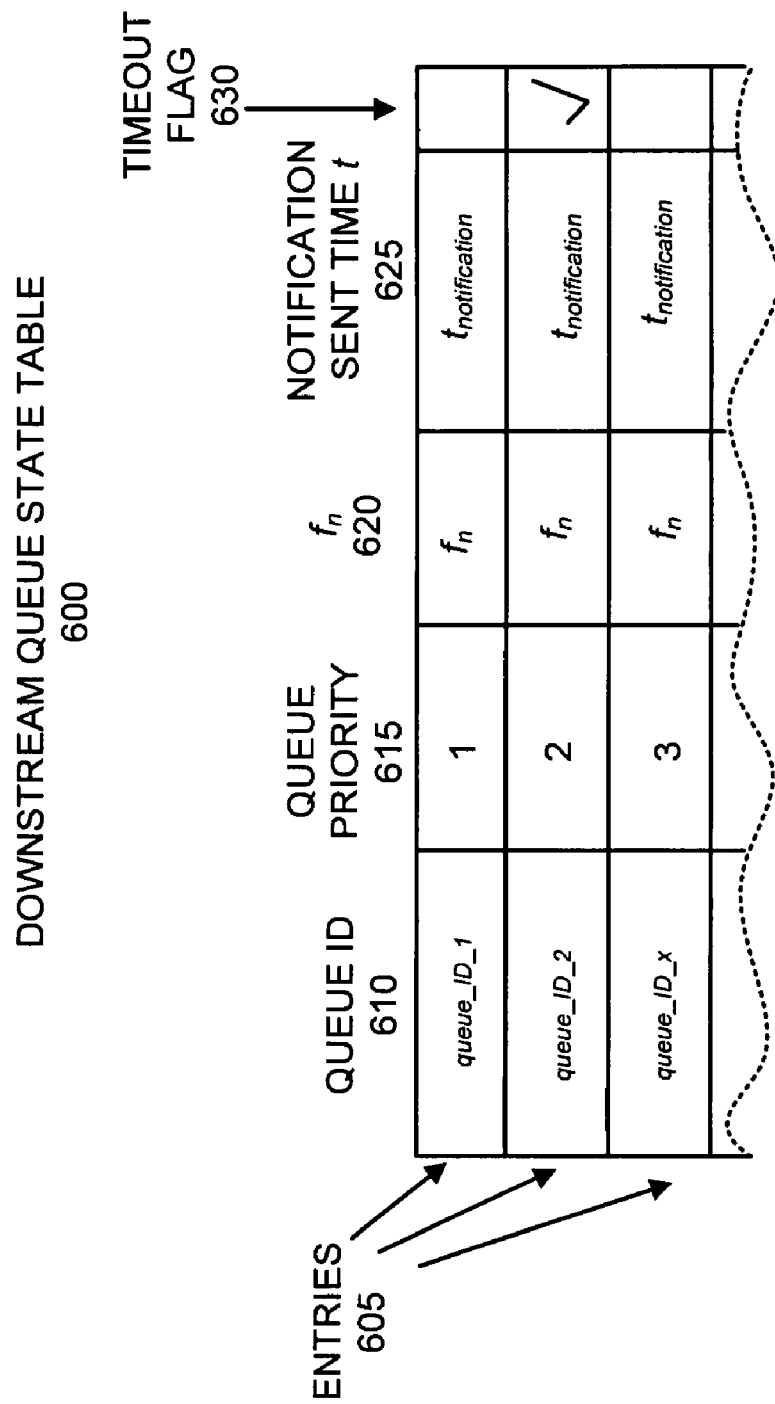

FIG. 6 illustrates an exemplary queue state table 600 that may be stored in association with a downstream service card of network device 100. Each service card 110, 120 and 125 of network device 100 may have a respective queue state table 600 stored in association with it.

Queue state table 600 may include multiple entries 605, each of which may include a queue ID 610, a queue priority 615, a current queue state value $f_n$ 620, a notification sent time t 625, and a timeout flag 630. Queue ID 610 may uniquely identify a queue 310-$x$ of downstream queues 310. Queue priority 615 may identify a service priority level or service class associated with the queue identified by queue ID 610. Queue state value f, 620 may include the most recently determined queue state value for the queue identified by queue ID 610. Notification sent time t 625 may indicate the most recent time at which a notification message, that included queue ID 610 and queue state value 620, was sent to the upstream service cards. Timeout flag 630 may include a flag that indicates whether the downstream queue identified by queue ID 610 has been timed out.

Exemplary Downstream Notification Process

Figure 7A:
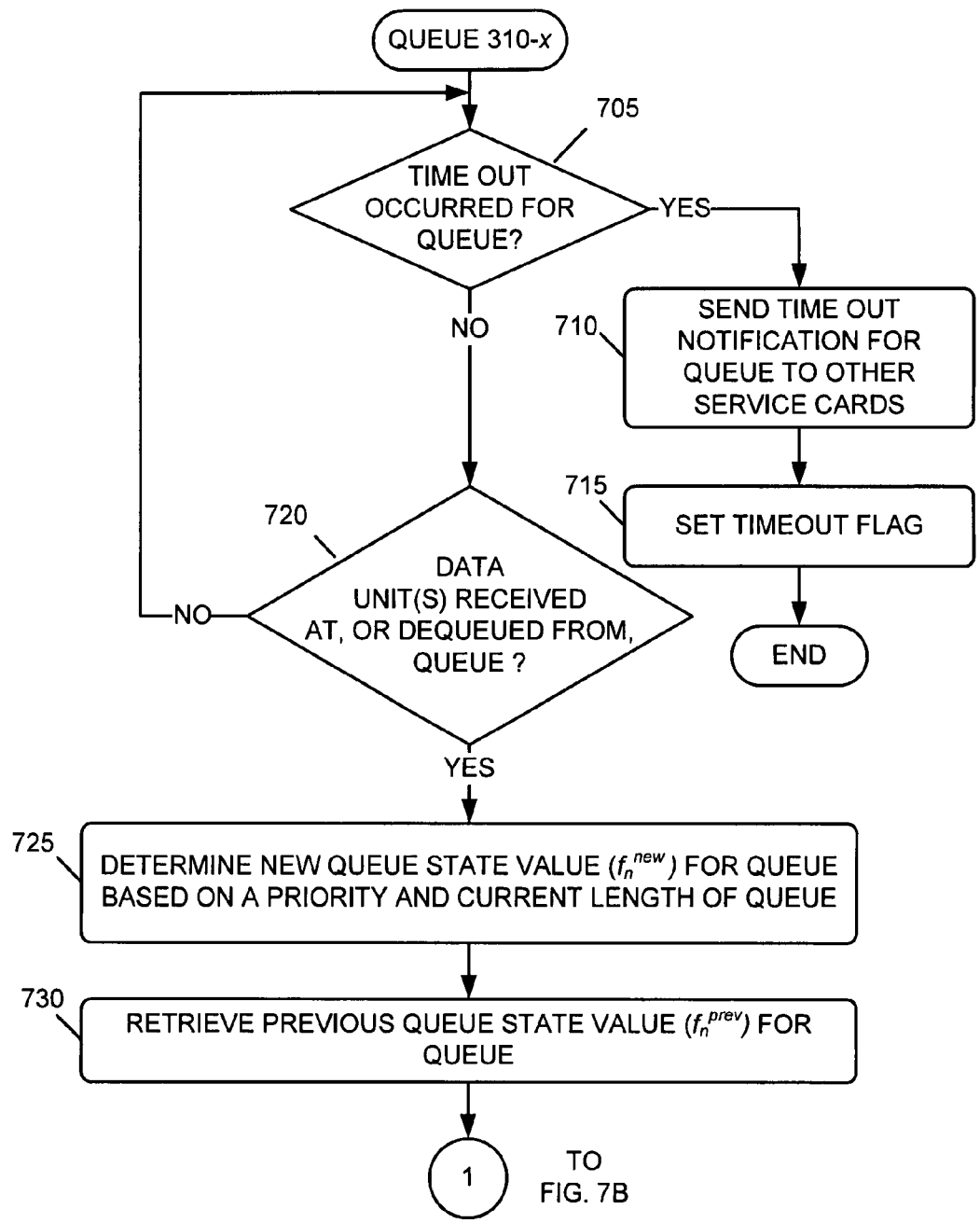
FIGS. 7A and 7B are flow charts that illustrate an exemplary process for sending notifications that include queue status updates from a downstream service card to upstream service cards of the network device of FIG. 1.
Figure 7B:
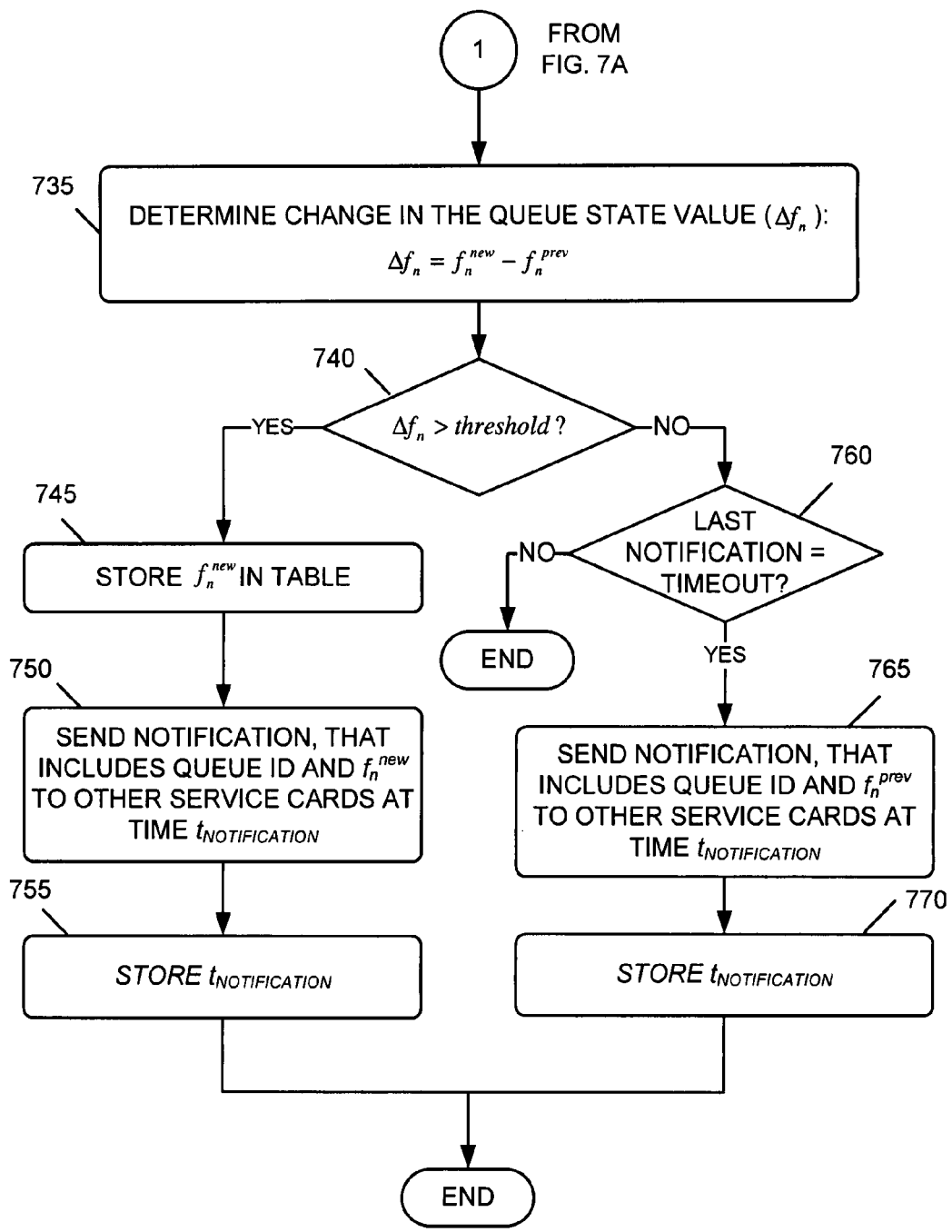

FIGS. 7A and 7B are flowcharts of an exemplary process for sending notifications, which include queue status updates, from a downstream service card 120 to upstream service cards 110. Since each of service cards 110, 120 and 125 may reside in the downstream path of a given data unit traversing through network device 100, each service card 110, 120 and 125 of network device 100 may perform the exemplary process of FIGS. 7A and 7B for each of its queues 310-1 through 310-P. A given downstream queue of queues 310-1 through 310-P has been identified generically in the exemplary process depicted in FIGS. 7A and 7B as "queue 310-$x$."

The exemplary process may begin with the determination of whether a time out has occurred for queue 310-$x$ (block 705). For example, a time out may occur if no data units have been received at service card 110, 120 or 125 for queue x for a configurable period of time. If a time out has occurred, scheduler 315 of the downstream service card may send a time out notification for queue 310-$x$ to all of the other service cards 110, 120 or 125 that may act as upstream cards for a given data unit (block 710). The time out notification provides an indication to the other service cards that queue x has been timed out. Scheduler 315 may also then set timeout flag 630 in queue state table 600 (block 715) indicating that queue 310-$x$ has been timed out.

If a data unit(s) is received at, or dequeued from, queue 310-$x$ (e.g., one of queues 310-1 through 310-P) (block 720), then a new queue state value ($f_n^{new}$) for queue 310-$x$ may be determined by scheduler 315 based on a priority of queue 310-$x$ and a current length of queue 310-$x$ (block 725). The new queue state value may, for example, be a function of the priority of queue x and a current length of queue 310-$x$. In one implementation, the function used to determine the new queue state value may include Eqn. (1) set forth above. In a circumstance where a last data unit(s) is dequeued from queue 310-$x$, then a new queue state value may be determined, since upstream service cards may eventually time out the queue state value maintained for queue 310-$x$ and reset the queue state value of queue 310-$x$ to a value of one.

A previous queue state value ($f_n^{prev}$) for queue 310-$x$ may be retrieved from queue state table 600 (block 730). For example, queue state value 620, corresponding to queue ID 610 of queue 310-$x$, may be retrieved from queue state table 600. A change in the queue state value ($\Delta f_n$) may then be determined (block 735) according to:

$$\Delta f_n = g_n^{new} - f_n^{prev} \qquad \text{Eqn. (2)}$$

A determination may be made whether the change in queue state value ($\Delta f_n$) is greater than a threshold value (block 740). The change in queue state value ($\Delta f_n$) may be compared with a pre-configured threshold value (e.g., a threshold constant) to determine which is greater. If the change in queue state value is greater than the threshold value, then the new queue state value ($f_n^{new}$) may be stored in queue state table 600

(block 745). For example, the new queue state value ($f_n^{new}$) may be stored in queue state value 620 of table 600, replacing the previously stored queue state value.

A notification, that includes a queue identifier for queue 310-x and the new queue state value ($f_n^{new}$), may be sent to all of the other service cards 110, 120 or 125, that may act as upstream cards for a given data unit, at a time $t_{notification}$ by scheduler 315 (block 750). The time $t_{notification}$ at which the notification was sent by scheduler 315 may then be stored in queue state table 600 (block 755). For example, $t_{notification}$ may be stored in notification sent time t 625 in the entry 605 corresponding to queue x.

Returning to block 740, if the change in queue state value ($\Delta f_n$) is not greater than a threshold value, then a determination may be made whether the last notification sent to other service cards was a time out notification (block 760). If so, then scheduler 315 may send a notification that includes a queue identifier for queue 310-x and the previous queue state value ($f_n^{prev}$) to all of the other service cards 110, 120 or 125, that may act as upstream cards for a given data unit, at time $t_{notification}$ block 765). The time $t_{notification}$ may then be stored in queue state table 600 (block 770). For example, $t_{notification}$ may be stored in notification sent time t 625 in the entry 605 corresponding to queue x. The exemplary process of FIGS. 7A and 7B may be selectively repeated each time a data unit is received at, or dequeued from, a queue 310-x of service cards 110, 120 and 125.

Exemplary Upstream Notification Processing

Figure 8:
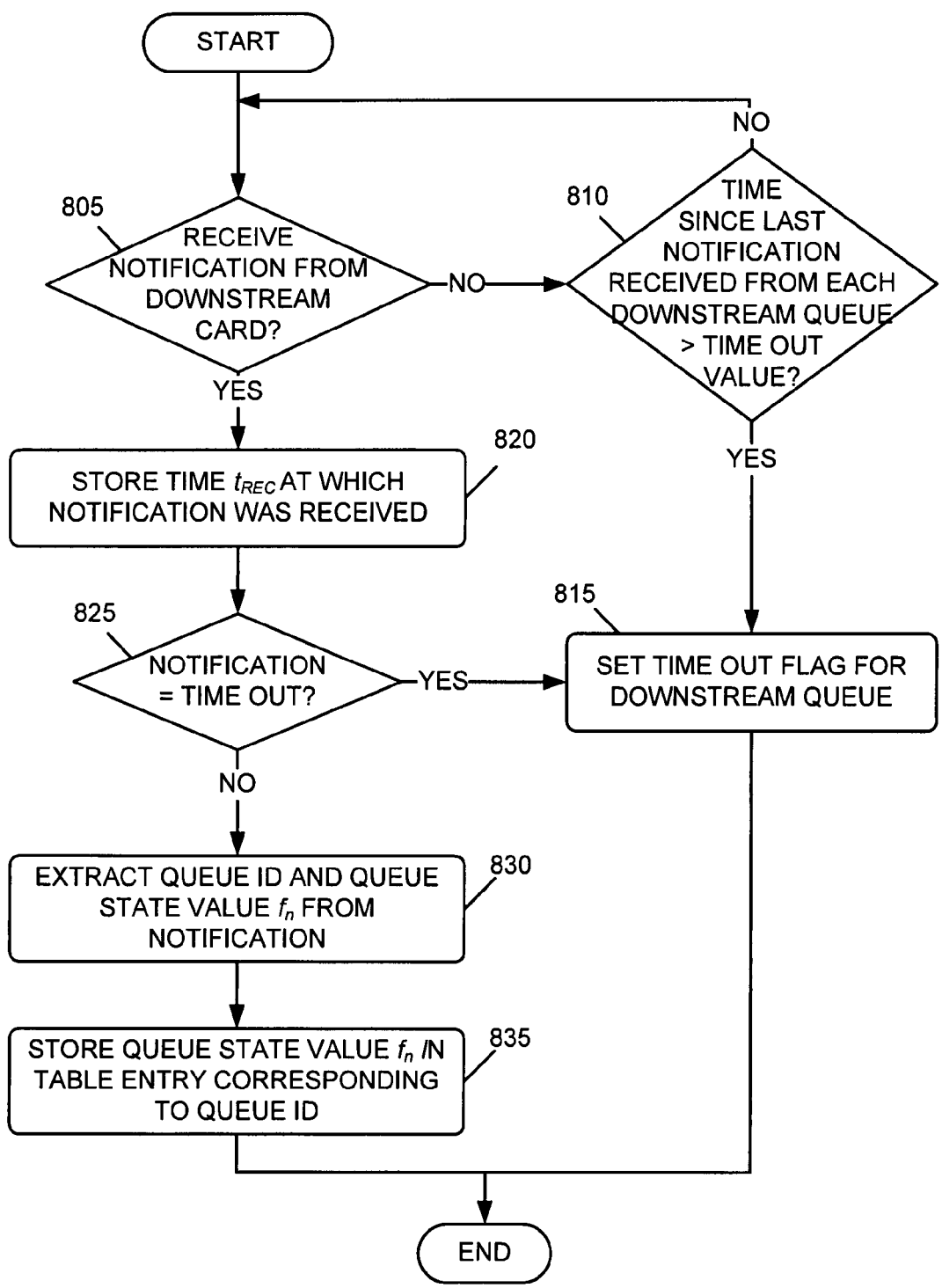
FIG. 8 is a flow chart that illustrates an exemplary process for processing a notification received at an upstream service card from a downstream service card of the network device of FIG. 1.

FIG. 8 is a flowchart of an exemplary process for processing a notification received at an upstream service card from a downstream service card. Each of service cards 110, 120 and 125, since they may each acts as a downstream or upstream service card, may perform the exemplary process of FIG. 8.

The exemplary process may begin with the determination of whether a notification has been received at an upstream service card from a downstream service card (block 805). If so, then a time $t_{REC}$ at which the notification was received may be stored in queue state table 500 (block 820). For example, $t_{REC}$ may be stored in notification receipt time t 520 in an entry 505 corresponding to the queue whose queue identifier is contained in the notification.

A determination may then be made whether the notification is a time out notification (block 825). If so, a time out flag for the downstream queue identified in the time out notification may be set in queue state table 500 (block 815). For example, time out flag 530 may be set in queue state table 500 indicating that the corresponding downstream queue is in a time out state. If the received notification is not a time out notification, then a queue identifier and queue state value $f_n$ may be extracted from the notification (block 830). The extracted queue state value $f_n$ may be stored in an entry 505 of queue state table 500 whose queue ID 515 corresponds to the extracted queue identifier (block 835).

Returning to block 805, if a notification has not been received from a downstream service card, then a determination may be made whether a time since a last notification was received from each of the downstream queues is greater than a time out value (block 810). The time out value may be a pre-configured value. If the time since the last notification was received from the downstream queues is not greater than the time out value, then the exemplary process may return to block 805. If the time since the last notification was received from the downstream queues is greater than the time out value, then the exemplary process may continue at block 815 above. The exemplary process of FIG. 8 may be selectively repeated each time a notification is received at a service card of service cards 110, 120 and 125.

Exemplary Upstream Data Unit Dequeueing Scheduling

Figure 9:
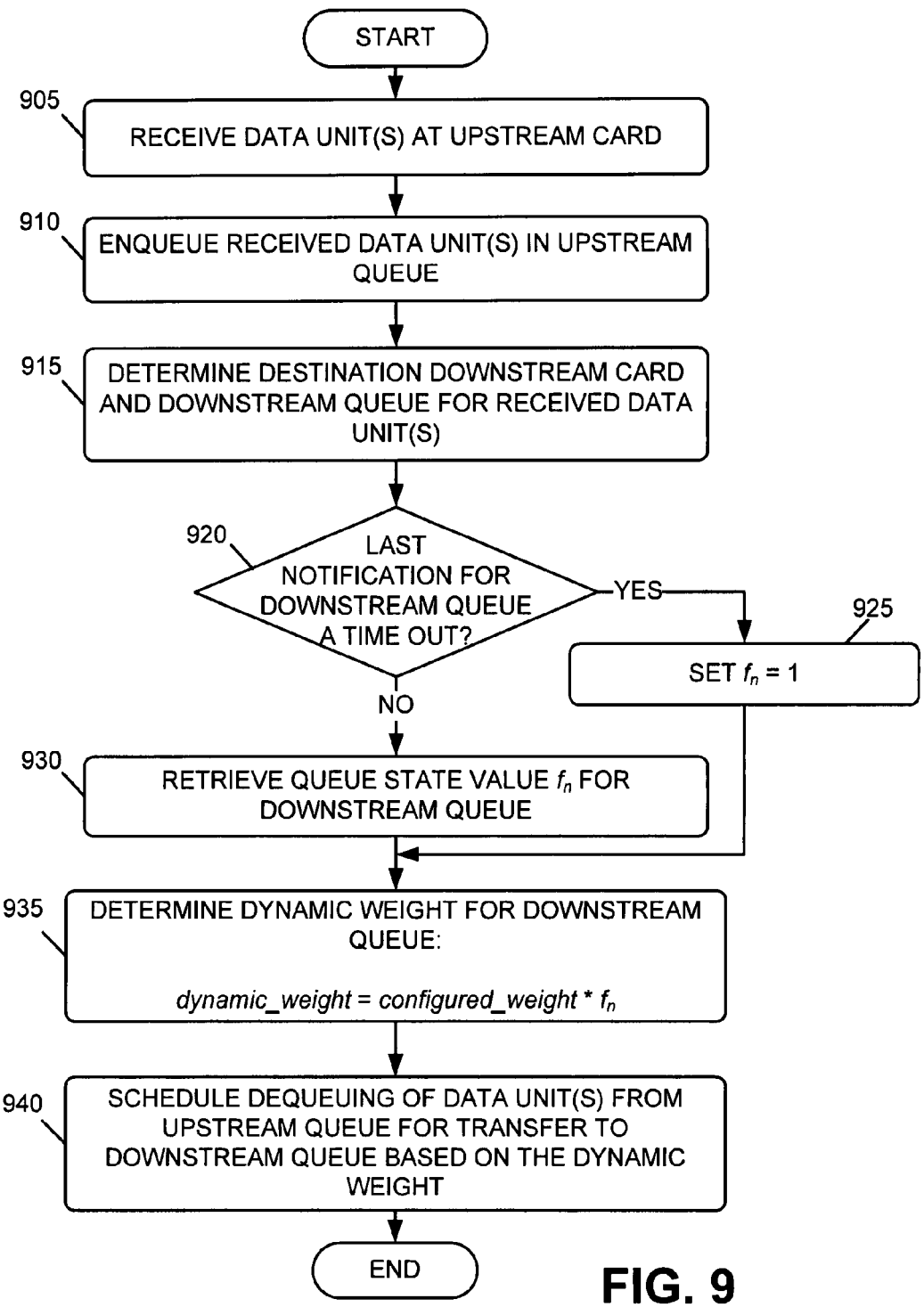
FIG. 9 is a flow chart that illustrates an exemplary process for scheduling the dequeueing of data units from upstream queues based on queue state information received from a destination downstream queue.

FIG. 9 is a flowchart of an exemplary process for scheduling the dequeueing of data units from upstream queues based on queue state information received from a destination downstream queue. Each of service cards 110, 120 and 125, acting as upstream cards, may perform the exemplary process of FIGS. 9A and 9B.

The exemplary process may begin with the receipt of an incoming data unit(s) at an upstream service card (block 905). The incoming data unit(s) may be received at interface 205 from a physical link connected to a network, from a service card 110-1 through 110-N acting as an ingress service card, or from an intermediate service card 125-1 through 125-Q. The received data unit(s) may be enqueued in one of upstream queues 215 (block 910). Classifier 210 may classify the priority or class of the received data unit(s) and queue it in an appropriate one of upstream queues 215. For example, if the data unit is classified as a high priority data unit, then it may be queued in priority 1 queue 215-1. A destination downstream service card and downstream queue may be determined for the received data unit (block 915). If the data unit requires special processing, then one of intermediate service cards 125-1 through 125-Q may be the next destination downstream service card. A forwarding engine may identify a next hop destination for the data unit based on a destination address contained in the header of the data unit, and a corresponding destination downstream service card and downstream queue may be determined based on the next hop destination. The next hop destination for the data unit may be connected via a link to one of service cards 110, 120 and 125, and this service card may be the destination downstream card for the data unit. The downstream queue for the data unit may be based on the priority or class of the data unit.

A determination may be made whether the last notification received from the destination downstream queue was a time out notification (block 920). If so, the queue state value for the destination downstream queue may be set equal to one (block 925). If the last notification received for the destination downstream queue was not a time out (block 920), then the queue state value ($f_n$) for the destination downstream queue may be retrieved from queue state table 500 (block 930). For example, queue state value $f_n$ 525 may be retrieved from an entry 505 of queue state table 500 whose queue ID 515 corresponds to the destination downstream queue.

A dynamic weight may be determined (block 935) for the destination downstream queue according to:

$$\text{dynamic\_weight} = \text{configured\_weight} * f_n \qquad \text{Eqn. (3)}$$

where configured_weight is a pre-configured weight value. In some implementations, the dynamic weights for all active queues may be normalized. Thus, a change in a dynamic weight (e.g., a newly determined dynamic weight) for a given active downstream queue may lead to a change in the dynamic weights for all of the other active downstream queues (i.e., via normalization of dynamic weights for all of the active queues).

Dequeueing of the data unit(s) from the upsteam queue may be scheduled, based on the determined dynamic weight, for transferring the data unit(s) to the destination downstream queue (block 940). The dequeued data unit(s) may be passed to switch fabric 115 which, in turn, transfers the data unit(s) to the appropriate downstream queue for queueing and, in the case where the downstream card is acting as the egress service card, eventual forwarding to the data unit's next hop network destination. In the case where the downstream service card is one of the intermediate service cards 125-1 through 125-Q, the exemplary process of FIG. 9 may be repeated for each intermediate service card 125 in the path between an upstream service card acting as an ingress card and a downstream service card acting as an egress card.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention. For example, certain portions have been described as executed as instructions by one or more processing units. However, implementations, other then software implementations, may be used, including, for example, hardware implementations such as application specific integrated circuits, field programmable gate arrays, or combinations of hardware and software. As another example, exemplary implementations have been described herein as using notification messages for sending updated queue state values ($f_n$) from downstream service cards to upstream service cards. In other implementations, however, instead of using notification messages, the updated queue state values ($f_n$) may be stored in a location of a distributed shared memory, which may be accessed by both upstream and downstream service cards.

While series of blocks have been described in FIGS. 7A, 7B, 8 and 9, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A network device, comprising:
a first ingress card to receive a first data unit from a network and including a first upstream queue that queues the received first data unit;
a switch fabric coupled to the ingress card and to a first egress card and to transfer data units from the ingress card to the first egress card;
the first egress card including a first downstream queue for buffering the first data unit prior to forwarding the first data unit towards a destination via the network, the first egress card to:
determine a first scheduling value as a function of a priority of the first downstream queue, a maximum size of the first downstream queue, and a current length of the first downstream queue, and
send the first scheduling value to the first ingress card,
where the first ingress card is further to schedule dequeuing of the first data unit from the first upstream queue based on the first scheduling value,
where the first ingress card is further to receive a second data unit from the network and includes a second upstream queue that queues the received second data unit and further comprising:
a second egress card that includes a second downstream queue for buffering the second data unit prior to forwarding the second data unit towards a destination via the network, the second egress card to:
determine a second scheduling value as a function of a priority and current length of the second downstream queue, and
send the second scheduling value to the first ingress card; and
where the first ingress card is further to schedule dequeuing of the second data unit from the second upstream queue based on the second scheduling value.

2. The network device of claim 1, further comprising:
a second ingress card to receive a second data unit from the network and including a second upstream queue that queues the received second data unit;
the egress card to send the first scheduling value to the second ingress card;
where the second ingress card is further to schedule dequeueing of the second data unit from the second upstream queue based on the first scheduling value.

3. The network device of claim 1, where the function comprises:

$$f_n(\text{priority, queue\_length}) = 1 - \left(\frac{\text{queue\_length}}{\text{full\_queue\_size}}\right)^{\text{priority}},$$

where
n is an identifier associated with the first downstream queue,
priority is the priority associated with the first downstream queue,
queue_length is the current length of the first downstream queue, and
full_queue_size is the maximum size of the first downstream queue.

4. A method, comprising:
receiving, by a first ingress card in a network device, a first data unit from a network, the first ingress card including a first upstream queue that queues the received first data unit;
transferring, by a switch fabric coupled to the ingress card, data units from the ingress card to the first egress card;
buffering, by the first egress card, the first data unit, in a first downstream queue, prior to forwarding the first data unit towards a destination via the network, including:
determining a first scheduling value as a function of a priority of the first downstream queue, a maximum size of the first downstream queue, and a current length of the first downstream queue, and
sending the first scheduling value to the first ingress card;
scheduling, by the first ingress card, dequeuing of the first data unit from the first upstream queue based on the first scheduling value;
receiving, by the first ingress card, a second data unit from the network, the first ingress card further including a second upstream queue that queues the received second data unit;

buffering, by a second egress card, the second data unit, in a second downstream queue, prior to forwarding the second data unit towards a destination via the network, including:
- determining a second scheduling value as a function of a priority and current length of the second downstream queue, and
- sending the second scheduling value to the first ingress card; and scheduling, by the first ingress card, dequeuing of the second data unit from the second upstream queue based on the second scheduling value.

5. The method of 4, further comprising:

a second ingress card to receive a second data unit from the network and including a second upstream queue that queues the received second data unit;

the egress card to send the first scheduling value to the second ingress card;

where the second ingress card is further to schedule dequeueing of the second data unit from the second upstream queue based on the first scheduling value.

6. The method of claim 4, where the function comprises:

$$f_n(\text{priority, queue\_length}) = 1 - \left(\frac{\text{queue\_length}}{\text{full\_queue\_size}}\right)^{\text{priority}},$$

where
- n is an identifier associated with the downstream queue,
- priority is the priority associated with the downstream queue,
- queue_length is the current length of the downstream queue, and
- full_queue_size is the maximum size of the downstream queue.

* * * * *